United States Patent [19]

Frister

[11] Patent Number: 4,687,960
[45] Date of Patent: Aug. 18, 1987

[54] METHOD AND APPARATUS TO REDUCE OPERATING NOISE OF DYNAMO ELECTRIC MACHINES, PARTICULARLY VEHICULAR THREE-PHASE ALTERNATORS

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 848,406

[22] Filed: Apr. 4, 1986

[30] Foreign Application Priority Data

May 14, 1985 [DE] Fed. Rep. of Germany ....... 3517330

[51] Int. Cl.$^4$ ............................................ H02K 15/02
[52] U.S. Cl. ........................................ 310/42; 29/596; 29/609; 228/190; 310/51; 310/216; 310/217
[58] Field of Search .......................... 29/596, 598, 609; 228/190, 179; 310/217, 216, 42, 254, 258

[56] References Cited

U.S. PATENT DOCUMENTS 2,845,555  7/1958  Carpenter et al. ................ 310/216
3,330,031  7/1967  Rediger et al. ........................ 29/598

Primary Examiner—Carl E. Hall
Attorney, Agent, or Firm—Frishauf, Holtz, Goodman & Woodward

[57] ABSTRACT

To counteract magnetic forces arising in the operation of a dynamo electric machine, and more particularly a vehicular, especially automotive three-phase alternator, causing, in operation, noise due to shifting of laminations under the influence of magnetic forces, the stator laminations are connected together at a circumferential edge, preferably the outer circumference, by a welding seam or track applied by laser welding. More than one seam or track may be provided, the welding seams or tracks extending in undulating or zig-zag form from one end face of the stack to the other in a criss-cross or mesh pattern.

22 Claims, 3 Drawing Figures

METHOD AND APPARATUS TO REDUCE OPERATING NOISE OF DYNAMO ELECTRIC MACHINES, PARTICULARLY VEHICULAR THREE-PHASE ALTERNATORS

REFERENCE TO RELATED PATENT, ASSIGNED TO THE ASSIGNEE OF THE PRESENT APPLICATION

German Patent Application No. P 32 08 893.0 (DE-OS No. 32 08 893; U.S. Ser. No. 470,266 —filing date: Feb. 28, 1983), now U.S. Pat. No. 4,540,709, Hagenlocher et al.

The present invention relates to dynamo electric machinery, and more particularly to dynamo electric machines suitable for vehicular use, espceically automotive-type three-phase alternators.

BACKGROUND

Dynamo electric machines, and especially alternators of the automotive type, in operation, cause noise which may be due to chatter or hum of laminations which vibrate with respect to each other. In automotive apparatus, which operates at highly variable speeds, the pitch of the generated noise changes with speed of the engine driving the alternator. It is particularly annoying at various speeds, where resonance effects may occur.

Alternators, especially of the vehicular type, usually have two end shields or end disks or end bells between which a stator package is clamped. The stator package customarily is formed of a plurality of essentially ring-like stator laminations, stacked together to form the stator magnetic circuit. The end bells form supports for accessory equipment, as well as for the bearings for a rotor, rotating within the stator.

THE INVENTION

It is an object to reduce the noise generated during operation of the machine, and especially to reduce noise of variable pitch which arises upon operation of an automotive-type alternator, at different speeds, and subjected to different loading.

Briefly, the operating noise is reduced by providing means to counteract varying magnetic forces which arise in operation of the machine and to stabilize the laminations of the stator stack against each other with respect to such forces. The laminations can be effectively stabilized by passing at least one welding seam or track, circumferentially and preferably also diagonally around the circular surfaces of the stack of laminations, thereby connecting edge portions of the laminations together.

In a preferred form of the invention, diagonal cross tracks may be formed, preferably extending at the outer circumference of the stator stack.

The arrangement has the advantage that noise reduction is effectively obtained with a minimum of additional operating steps during manufacture of the dynamo electric machine, and does not require additional components or structural elements, for example to shield noise which has already been generated.

Deformation of the stator laminations or the stack of laminations is effectively reduced. The present invention is based on the discovery that a substantial component of noise, resulting from operation in the machine, is caused by continuously changing magnetic forces which tend to radially and axially deform the stator of the generator, and, acting on the laminations, tend to continuously change the relative positions of the laminations with respect to each other. The stator stack may go into oscillation with frequencies which are determined by the operating speed of the alternator, and may, frequently, be a multiple of the respective speed in rpm. The magnetic forces, which cause radial as well as axial deformation of the stack of the stator laminations, cause noise; in accordance with the invention, the forces acting on the laminations are effectively countered so that the resulting noise is prevented from occurring.

In accordance with a preferred feature of the invention, a welding bead or welding seam is formed by a laser welding apparatus which connects the edges of the laminations. The resulting welding seam or welding bead extends, preferably, in zig-zag form, about the circumference of the stator stack, and in accordance with a preferred feature, around the outer circumference of the stator stack. Selecting the outer circumference has the advantage of simplicity of manufacture. More than one zig-zag seam may be provided, with the seams intersecting each other to form an open-mesh arrangement.

In accordance with a feature of the invention, the seams can be applied after the stator stack has been assembled, for example when, in the manufacture of the stator assembly and during winding of the stator with wire, the stator stack is rotated in a jig. The zig-zag seam can be applied at the same time. Alternatively, the stator stack can be held in a fixed position, and a laser passed thereabout, or a laser beam generated which is suitably deflected by mirrors, providing for impingement of the laser beam on the stator stack in accordance with deflection of the mirror.

DRAWINGS

DETAILED DESCRIPTION

Figure 1:
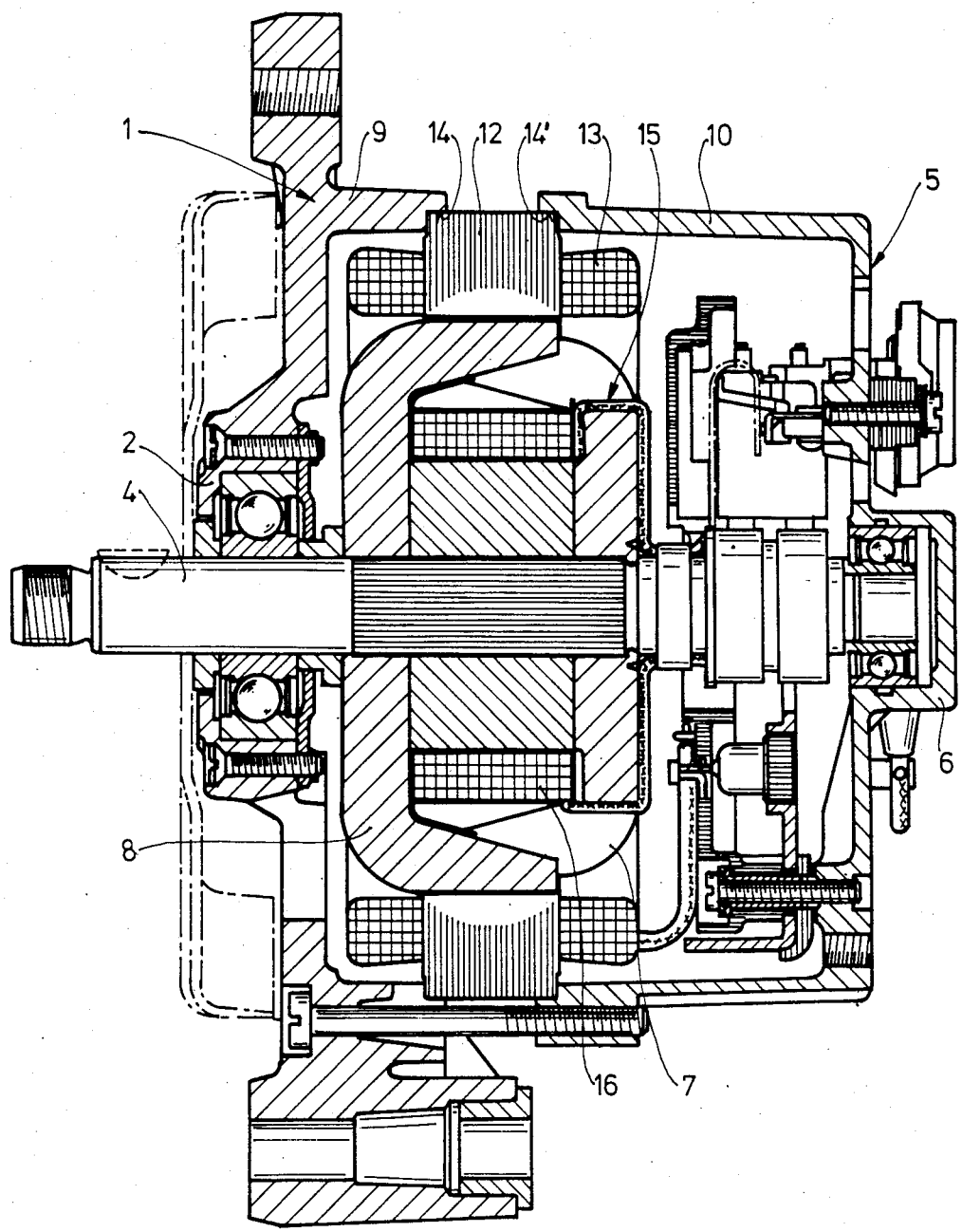
FIG. 1 is a schematic longitudinal sectional view through an automotive-type claw-pole alternator of standard construction, and illustrating the basic structure, to which the present invention is applied.

The vehicular, typically automotive-type three-phase alternator shown in FIG. 1 will be described only in general terms since the alternator may be of any well known structure.

Two end bells or bearings 1 and 5 have placed thereon, respectively, hubs 2, 6, to receive bearings for the shaft 4 of a rotor. The end bells or end shields 1, 5 are axially extended to form, essentially cylindrical cup or pot-shaped extensions 9, 10. A stator stack 12, having a stator winding 13 therein, is received in suitable stator receiving grooves or rings 14, 14', respectively, formed in the cylindrical extensions 9, 10 of the end shields or elements 1, 5. The axis of the stator stack extends lengthwise of the machine.

The rotor has a rotor shaft 4, on which two claw-pole halves 7, 8 are attached, and further including an iron core on which a field winding 16 is wound. The structure of the alternator described so far is entirely conventional.

Figure 2A:
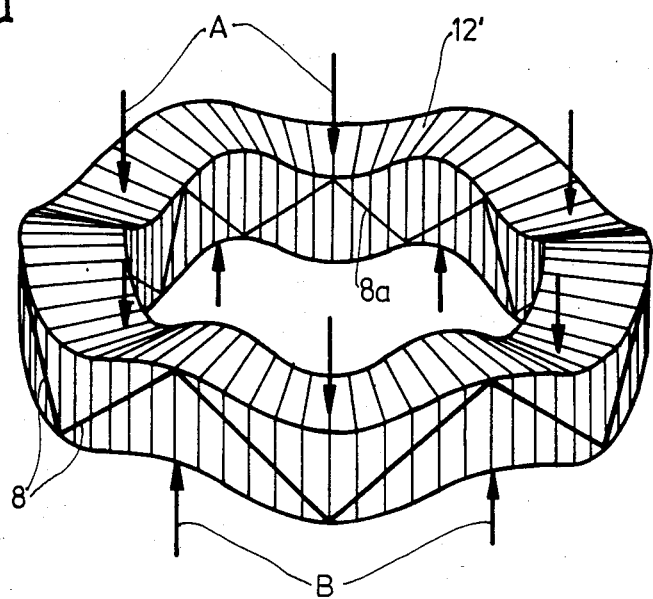
FIG. 2a is a perspective schematic illustration of a stator lamination stack, illustrating magnetic forces acting thereon, and showing the welding seams or beads applied to reduce noise.

During operation, that is, rotation of the rotor, magnetic forces will continually act on the stator of the generator due to the mutual magnetic induction effect and the change in magnetic force lines occurring due to the passage of the claw poles upon energization of the field winding 16. Referring to FIG. 2a, the stator laminations 12' are shown, omitting winding slots and the like, in highly schematic form. Magnetic forces shown by the heavy black arrows A and B tend to deform the stator laminations into the undulating form shown. Of course, the deformation is illustrated highly exaggerated, for purposes of better understanding and illustration. In a rotating field, the forces likewise will rotate and, as can readily be seen, the individual laminations of the stator stack 12' will be continuously subjected to the magnetic forces. The magnetic forces have a definite axial component, resulting in the deformations shown in FIG. 2a.

Figure 2B:
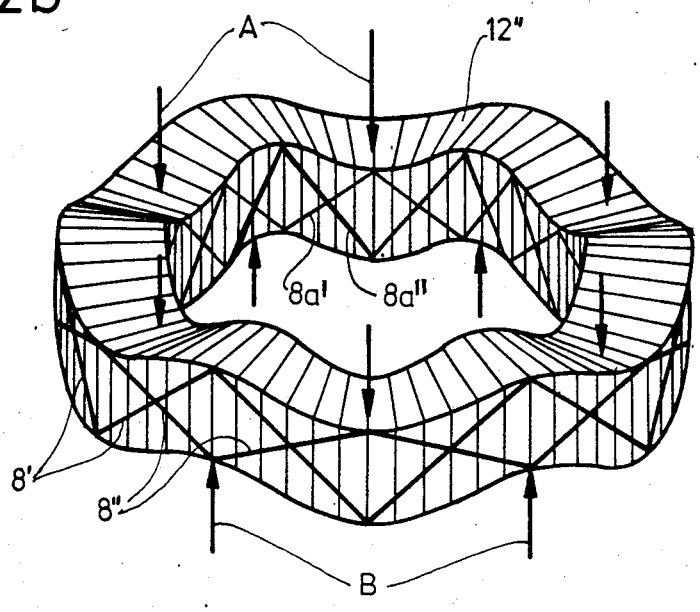
FIG. 2b is a view similar to FIG. 2a, showing another arrangement of welding seams.

The magnetic forces tend to shift the stator laminations with respect to each other. In order to prevent this relative shift, welding beads or seams 8 are placed, in accordance with the present invention, endlessly around the circumference of the stator stack. In accordance with a preferred feature, the welding seams or beads are located externally, that is, about the outer circumference of the stator stack. Similar beads or seams may also be located at the inner circumference, as shown at 8a, and both outer and inner seams or beads 8, 8a may be used in dependence on the forces to be overcome. The seams 8, 8a or, as shown in FIG. 2b, the seams 8', 8" and 8a', 8a" extend in approximate zig-zag or undulating form from one axial end of the stack to the other axial end about the circumference of the stator stack, as schematically shown in the drawings. Crossing weld seam arrangements, as shown schematically in FIG. 2b, are likewise possible. The zig-zag shape of the welding beams is particularly desirable since the respective stator stacks are all connected thereby and interconnected along the welding seams into a unitary hole. The welding seams or beads thus form a carrier or support structure for all of the stator laminations which, otherwise, are only adhered together. As can readily be seen, the welding seams or beads counteract axial and radial deformations and form quasi-stiff support struts or support trusses for the individual thin stator laminations, resulting in surrounding and complete stabilization of the structure of the stator stack formed by the individual stator laminations. The arrangement effectively prevents oscillations from occurring. The oscillations may be based on any external forces, the most usual external forces being counteracted, however, being the magnetic forces which tend to deform respectively adjacent laminations. Consequently, the noise generated in operation, due to occurring vibrations or slight shifting of the laminae with respect to each other is effectively avoided.

In accordance with a feature of the invention, the beads or seams are applied by laser beams which are directed, in well known and customary manner, against the respective circumferential surface of the laminations of the stack. Conventional laser welding arrangements may be used which are applied during the manufacture and/or the winding operations to form a complete wound dynamo electric stator 12, with winding 13 (FIG. 1). The welding step can be carried out either before or after the laminations are wound.

Various changes and modifications may be made, and features described in connection with any one of the embodiments may be used with any of the others within the scope of the inventive concept.

I claim:

1. In a method of manufacturing a dynamo electric machine, having a housing (1, 9, 5, 10) and a stator formed of a stack of ring laminations (12, 12', 12") retained in the housing,
   comprising the step of assembling the stator laminations in a stack to provide a stator stack defining a stack axis, an inner circumferential stack surface, and an outer circumferential stack surface.
   a method of reducing operating noise of the dynamo electric machine further comprising the step of
   stabilizing the laminations in the stack of laminations (12, 12', 12") with respect to varying magnetic forces acting thereon and which forces arise in operation of the machine,
   said stabilizing step including placing at least one circumferentially extending and axially undulating endless welding seam or track on the edges of the laminations forming one of said stator circumferential stack surfaces.

2. Method according to claim 1, wherein the endless welding seam or track is placed at the outer circumferential surface, of the stack.

3. Method according to claim 1, wherein the endless welding seam or track is placed at the inner circumferential surface of the stack.

4. Method according to claim 1, wherein an endless welding seam or track is placed both at the outer and at the inner circumferential surfaces of the stack.

5. Method according to claim 1, wherein the welding seam is placed in circumferential zig-zag or undulating form, from one end lamina at one end face of the stack to another end lamina at the other end face of the stack.

6. Method according to claim 5, wherein the welding seam or track is placed at the outer circumferential surface of the stack.

7. Method according to claim 5, wherein the welding seam or track is placed at the inner circumferential surface of the stack.

8. Method according to claim 5, wherein a welding seam or track is placed both at the outer and at the inner circumferential surfaces of the stack.

9. Method according to claim 1, wherein at least two welding seams or tracks are placed on at least one of the circumferential surfaces of the edges of the laminations, said at least two welding seams or tracks intersecting each other in a cross-cross or mesh pattern.

10. Method according to claim 9, wherein the welding seams or tracks are located at the outer circumferential surface of the stack of laminations.

11. Method according to claim 1, wherein the step of placing the at least one circumferentially extending welding seam or track comprises forming a welding seam or track by a laser welding method.

12. Method according to claim 11, wherein the welding seam or track is placed at the external circumferential of the stack.

13. Method according to claim 11, wherein the welding seam is placed in zig-zag or undulating form, from one end lamina at one end face of the stack to another end lamina at the other end face of the stack.

14. Method according to claim 11, wherein at least two welding seams or tracks are placed on at least one of the circumferential surfaces of the edges of the laminations, said at least two welding seams or tracks intersecting each other in a criss-cross or mesh pattern.

15. Method according to claim 14, wherein the welding seams or tracks are located at the outer circumferential surface of the stack of laminations.

16. The method of manufacturing a vehicular type three-phase generator,
wherein the laminations are generator stack laminations
comprising carrying out the method of claim 1.

17. Operating noise reduced dynamo electric machine having a housing;
a stator stack formed of ring-shaped laminations (12, 12', 12") retained in the housing, and defining a stack axis, an inner stack circumferential surface, and an outer stack circumferential surface
and comprising, in accordance with the invention,
means for counteracting varying magnetic forces arising in the operation of the machine and for stabilizing the laminations with respect to each other and against the effect of such forces,
said force counteracting stabilizing means including at least one endless welding seam or track extending circumferentially and part axially diagonally on at least one of the circumferential surfaces of the stack of laminations and connecting edge portions of the laminations together.

18. Machine according to claim 17, wherein said welding seam or track is placed at the outer in circumferential surface of the stack of laminations.

19. Machine according to claim 17, wherein said welding seam or track is placed on the inner circumferential surface of the stack of laminations.

20. Machine according to claim 17, wherein a plurality of welding seams or tracks are provided, said tracks being laser-generated welding seams or tracks and extending in cross-cross or mesh pattern and crossing each other.

21. Machine according to claim 20, wherein the welding seams or tracks are located at the outer circumferential surface of the stack of laminations, and extend in zig-zag or undulating formation from one end face of the stack of laminations to the other.

22. Machine according to claim 17 wherein said dynamo electric machine comprises a vehicular type three-phase alternator.

* * * * *